(12) United States Patent
Zeitler et al.

(10) Patent No.: US 8,221,664 B2
(45) Date of Patent: Jul. 17, 2012

(54) HOT AXIAL PRESSING METHOD

(75) Inventors: Guenter Zeitler, Aachen (DE); Herbert Schreinemacher, Baesweiler (DE); Cornelis Ronda, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 303 days.

(21) Appl. No.: 12/519,583

(22) PCT Filed: Dec. 19, 2007

(86) PCT No.: PCT/IB2007/055221
§ 371 (c)(1),
(2), (4) Date: Jan. 27, 2010

(87) PCT Pub. No.: WO2008/075296
PCT Pub. Date: Jun. 26, 2008

(65) Prior Publication Data
US 2010/0167909 A1      Jul. 1, 2010

(30) Foreign Application Priority Data

Dec. 20, 2006   (EP) ..................................... 06126654

(51) Int. Cl.
*B29C 47/76*   (2006.01)
(52) U.S. Cl. ................. 264/102; 264/125; 264/319
(58) Field of Classification Search ............... 264/102, 264/125, 319; 250/370.11
See application file for complete search history.

(56) References Cited

U.S. PATENT DOCUMENTS

| | | | | |
|---|---|---|---|---|
| 4,009,977 A | * | 3/1977 | Chao | ................................ 425/78 |
| 4,382,053 A | * | 5/1983 | Rigby | ............................ 264/120 |
| 5,296,163 A | | 3/1994 | Leppert et al. | |
| 5,518,658 A | | 5/1996 | Rossner et al. | |
| 6,270,702 B1 | | 8/2001 | Leppert | |
| 6,967,330 B1 | | 11/2005 | Lempicki et al. | |

FOREIGN PATENT DOCUMENTS

| | | |
|---|---|---|
| GB | 1013156 A | 12/1965 |
| GB | 1139280 A | 1/1969 |
| WO | 2005110943 A1 | 11/2005 |

* cited by examiner

*Primary Examiner* — Joseph Del Sole
*Assistant Examiner* — James Sanders

(57) ABSTRACT

A hot axial pressing method for sintering a ceramic powder, particularly doped $Gd_2O_2S$, comprises the step of placing a first porous body (7), the ceramic powder (9) and a second porous body (7) into a mould shell (5) supported by a support (13, 14). The ceramic powder (9) is located between the porous bodies (7). Gaseous components are evacuated from the ceramic powder (9) up to an ambient pressure of less than 0.8 bar. The porous body (7) and the ceramic powder (9) are heated to a maximum temperature of at least 900° C. and are applied to a pressure up to a maximum pressure of at least 75 Mpa. According to the invention the variation in time of the heating step and the variation in time of the pressure applying step is adjusted to each other such that the mould shell 5 is held by the porous bodies (7) and/or the ceramic powder (9) in a state where the mould shell (5) and the support (13, 14) are disconnected with respect to each other.

17 Claims, 2 Drawing Sheets

HOT AXIAL PRESSING METHOD

Figure 1:
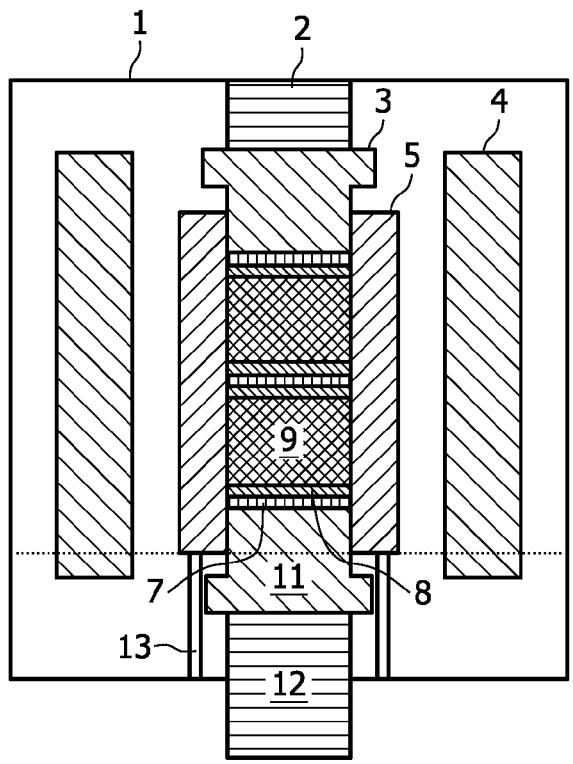

The present invention relates to a hot axial pressing method for sintering a ceramic powder, particularly doped $Gd_2O_2S$ (GOS).

The present invention is further directed towards a ceramic material producible by the method according to the invention.

$Gd_2O_2S$ (GOS), especially doped with Pr and Ce, is an efficient-x-ray phosphor which can be used in computer tomography (CT)-scanners as scintillator material. However, the phenomenon of afterglow which either increases the time needed to perform a CT-scan or which reduces the quality of the image hampers the practical application of GOS-material.

The afterglow characteristics of GOS-ceramic wafers strongly depend upon the production process itself.

A production process for producing GOS-wafers is known from the WO 2005/110943. In order to sinter the GOS a hot uniaxial pressing method is used. According to this method a ceramic powder of doped GOS is placed into a mould shell. A vacuum is applied to the ceramic powder in order to evacuate gaseous components from the ceramic powder especially ambient air. A moveable die is forced towards a fixed die by applying a high pressure of more than 75 MPa. This process takes place at high temperatures of more than 900° C. In this process step, the GOS-powder is densified and sintered. It is further known to place between the ceramic powder and each of the dies a porous body consisting of graphite. The porous graphite body prevents a reaction of the GOS-powder with the die material. Due to the porosity of the graphite the step of evacuating ambient air from the GOS-powder is not hampered.

It is a disadvantage of this hot uniaxial pressing method that the GOS-wafer made from the sintered GOS-powder comprises a spreading of the ceramic density leading to internal inhomogeneities. These inhomogeneities reduce the quality of images performed by a CT-scanner using these GOS-wafers. As a consequence it is necessary to choose a small physical dimension of the GOS-wafer to be achieved, so that the spreading of the ceramic density is tolerable. Since only small GOS-wafers can be produced the production cost for producing GOS-wafers as well as producing CT-scanners are high.

It is an object of the invention to propose a hot axial pressing method which allows producing a ceramic material comprising an increased size without increasing internal inhomogeneities like the spreading of the ceramic density.

This object is solved by a method and by a ceramic material according to the claims and preferred embodiments of the invention are given.

The method according to the invention is a hot axial pressing method for sintering a ceramic powder, particularly doped $Gd_2O_2S$ (GOS), wherein a first porous body, the ceramic powder and a second porous body are placed into a mould shell. The ceramic powder is located between the porous bodies. The ceramic powder comprises particularly an appropriate sintering aid. The mould shell is supported by a support. By means of the support the mould shell is kept in place when the mould shell is filled with the porous bodies. The porous bodies comprise particularly graphite or consist of graphite. Vacuum is applied to the mould in order to evacuate gaseous components from the ceramic powder. The vacuum leads to an ambiance pressure of less than $\leq 0{,}8$ bar particularly less than $\leq 1 \times 10^{-3}$ bar. The ceramic powder and the porous bodies are heated up to a maximum temperature of at least $\geq 900°$ C. particularly $\geq 1100°$ C. and are applied to a pressure up to a maximum pressure of at least $\geq 75$ MPa particularly $\geq 120$ MPa. According to the invention the mould shell and the support are disconnected in the sintering step. This is due to friction of the porous bodies and/or the ceramic powder with the mould shell wall. For this purpose the variation in time of the heating step and the variation in time of the pressure-applying step are adjusted to each other accordingly.

Since the mould shell is not static but moveable with respect to the ceramic powder a high shearing stress between the mould shell and the ceramic powder is reduced when a die moves into the mould shell for increasing the pressure applied to the ceramic powder. When a high shearing stress occurs between the mould shell and the ceramic powder and/or the porous bodies the mould shell is able to move in a position where the shearing stress is reduced. Due to the reduced shearing stress the pressure applied to the ceramic powder is equalized, so that an inhomogeneous pressure spreading is prevented or at lest reduced. This in turn leads to an improved homogeneous ceramic density of the sintered ceramic material. Due to the increased homogeneity of the ceramic material the product size of the ceramic material can be increased. Thus, it is possible to produce more and/or greater wafers by a single sintering process.

Although the friction effects and the material properties of the porous body on the one hand and the powder on the other hand are completely different it is surprisingly possible that the mould shell, which is usually made of a heavy material is held by the porous bodies and/or the ceramic powder. It is believed that the mould shell is to a certain amount held by the porous body but not by such a high friction that the movement of the porous body inside the mould shell is prevented. This leads to a situation where the full pressure is applied to the ceramic powder but shearing stress at the contact face between the mould shell and the ceramic powder is reduced in comparison to a comparable situation without the porous bodies. This leads to a much more homogeneous pressure distribution than in case of fixed dies and consequently to more homogeneous wafers. Although a high pressure is applied to the ceramic powder the movement of the ceramic particles in the powder, especially transverse to the moving direction of a die is not disabled. On increasing the pressure, the ceramic particles are forced to move into the transversal direction as well. This will increase the friction with the mould wall and will lead to suspension of the mould.

The porous bodies are especially slightly press fitted in the mould shell, so that the porous bodies can be moved by the dies inside the mould shell and the mould shell may be held at a comparatively low pressure particularly at least 30 MPa preferably at least 15 MPa and most preferred at least 10 MPa. For that purpose the height of the porous bodies may be adapted accordingly. Due to an appropriate selection of material and geometry of the porous bodies it is even possible that the mould shell is held especially at the beginning of the pressing step by the porous bodies only. At a later state of the pressing step the mould shell may be held by both the porous bodies and the ceramic powder and/or by the ceramic powder only.

In a preferred embodiment a preferably inert lubricant is provided on the mould shell in order to reduce a friction between the mould shell and the ceramic powder as well as between the mould shell and the porous bodies. In the case of a tubular mould shell the lubricant is provided on the inner face of the mould shell. The lubricant may be preferably boron nitride. Although the friction between the mould shell and the ceramic powder as well as the porous bodies is reduced it is surprisingly possible to hold the heavy mould shell in the disconnected state, so that the mould shell is disconnected from the support during pressing in the suspended state. The reduced friction between the mould shell and the porous bodies does not have an impact on the homogeneity of the sintered ceramic material. Instead of reducing the homogeneity, the providing of the lubricant increases the homogeneity of the sintered ceramic material.

Preferably several wafers are produced in one single pressing step. For that reason several stacks are provided, wherein each stack comprises the ceramic powder arranged between the porous bodies. Preferably one porous body serves as the first porous body for the one stack and as the second porous body for the other stack. All stacks can be placed inside a single mould shell. Preferably a first stack is placed into a first mould shell and a second stack is placed into a second mould shell. Thus, at least two stacks are arranged inside two different mould shells. In this configuration the first mould shell can move independent of the second mould shell, so that each mould shell moves automatically in a position where the shearing stress in each stack is at its minimum.

Preferably a spacer element is provided between the first stack and the second stack. By means of spacer elements each stack can be encapsulated in its mould shell. Further the spacer element may safeguard that under no circumstance the porous body and/or the ceramic powder escapes the mould shell. For that reason the spacer element preferably comprises a stopper element by which the movement of the mould shell with respect to the spacer element is limited. For example the mould shell is tubular and the spacer element is cylindrical, wherein the spacer element comprises a diameter which corresponds to the inner diameter of the tubular mould shell. The stopper element can be a circumferential rip, wherein the diameter of the rip is larger than the inner diameter of the mould shell. Further the circumferential rip is arranged at such a height of the cylindrical spacer element that even at the beginning of the pressure-applying step no porous body can escape the mould shell, when the mould shell is in a position contacting the stopper element or the support.

The physical dimension of the spacer element as well as the material used for the spacer element with respect to its thermal extension coefficient is chosen such that in the disconnected state of the mould shell the friction force between the mould shell and the spacer element increases. Due to the increased friction force between the mould shell and spacer element the friction force between the mould shell and the ceramic powder and/or the porous bodies decreases. But the friction force between the mould shell and the spacer element should not be such high that a movement of the spacer element in the mould shell is prevented. This means the friction force between the mould shell and ceramic powder and/or the porous bodies should still be higher than in the state before applying pressure. In this situation the mould shell is held to a great amount by the spacer element but it is still possible to increase or decrease the pressure applied to the ceramic powder.

In order to increase or decrease the friction force between the mould shell and the spacer element the geometry of the spacer element may be changed during the pressing process. The geometry of the spacer element can be changed by mechanical means for example by a clamping means for clamping a mould shell to the spacer element, whereby the clamping means are preferably actuated by the applied pressure. The geometry of spacer element may be changed by adjusting the temperature of the spacer element by means of a temperature control means. For example the spacer element may comprise an electrical conductive ring on which a voltage is applied, so that the conductive ring heats the spacer element. Due to the heating the spacer element extends on the basis of thermal extension.

In a preferred embodiment the support by which the mould shell is supported before a pressure is applied is used as a heat radiation protection. For example the support is tubular and a die moves through the support into the mould shell. In this case the heat radiation emitted by the die is reflected so that an unwanted cooling is prevented. Since the support serves for two different purposes the number of component parts for the assembly performing the method according to the invention is reduced.

The invention relates further to a ceramic material producible by the method according to the invention and which comprises a higher homogeneity for the ceramic materials produced according to the method described in WO 2005/110943. Preferably the ceramic material according to the invention comprises particularly at least 99.9% (weight proportion) doped $Gd_2O_2S$ (GOS). This GOS-material comprises at the maximum 0.1% impurities. This sintered ceramic material comprises a low spreading of the ceramic density and a high homogeneity, so that more and/or larger GOS-wafer can be made from this ceramic material reducing the cost for producing CT-scanners.

The invention relates further to a computer tomography scanner comprising a ceramic wafer made of such a ceramic material.

The present invention is further illustrated with respect to the accompanying drawings.

Figure 2:
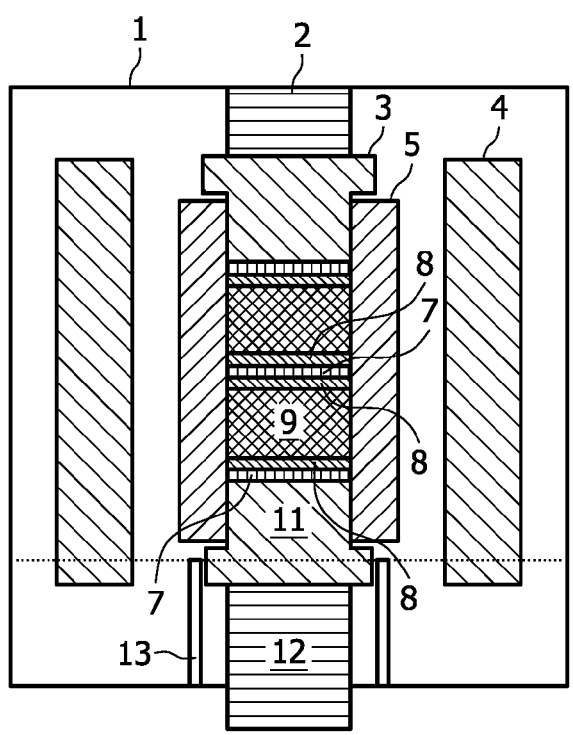
Figure 3:
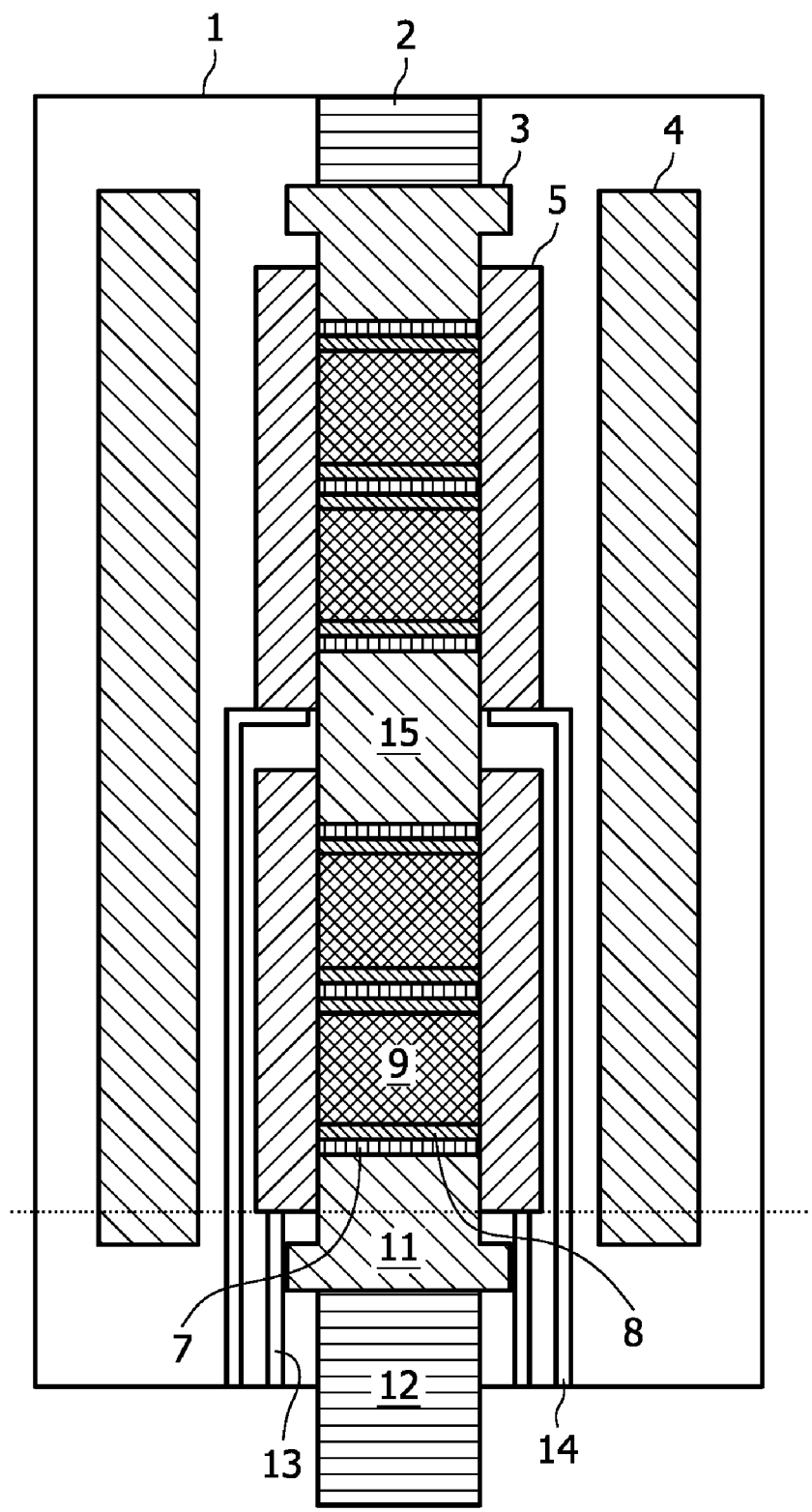

In the drawings:

FIG. 1 is a schematic sectional side view of a first embodiment of the apparatus for performing the method according to the invention at the beginning of the method, FIG. 2 is a schematic sectional side view of the apparatus of FIG. 1 at a later time and FIG. 3 is a schematic sectional side view of a second embodiment of an apparatus for performing the method according to the invention.

In FIG. 1 an apparatus for performing the method according to the invention is illustrated. The apparatus comprises a chamber 1 to which an upper base 2 is fixed. An upper die 3 is fixed to the upper base 2. Opposite to the upper die 3 a lower die 11 is arranged which is fixed to a piston 12, so that the lower die 11 is moveable. The dies 3, 11 are guided in a mould shell 5, which is supported by a support 13. A ceramic powder 9, which is specially $Gd_2O_2S$, is placed into the mould shell 5 between the dies 3, 11. Between the ceramic powder 9 and the dies 3, 11 graphite layers 7 are arranged on each die 3, 11. Preferably as illustrated a molybdenum foil 8 is provided between the ceramic powder 9 and the graphite layer 7. The molybdenum foil 8 transfers heat and pressure to the ceramic powder 9. Further the compacted ceramic material and the molybdenum foil 8 may be separated easily when a lubricant, preferably boron nitride is applied on the contact surface between the ceramic powder 9 and the molybdenum foils 8. As illustrated it is preferred to place several stacks comprising the ceramic powder 9, the graphite layers 7 and the molybdenum foil 8 into the mould shell. In the illustrated embodiment the graphite layer 7 in the middle is part of the upper stack as well as of the lower stack.

Inside the chamber 1 heating elements 4 are provided for heating the ceramic powder 9. In order to support the heating of the dies 3, 11 and the mould shell 5 consists of a material comprising a thermal conductivity of more than 50 W/mK, so that the dies 3, 11 and the mould shell 5 may transfer the heat of the heating elements 4. A suitable material is TZM, a solid-solution hardened and particle-strengthened molybdenum based alloy, which comprises titanium carbide and zirconium carbide.

For applying pressure to the ceramic powder 9 the piston 12 move upwards, so that the lower die 11 presses the ceramic powder 9 against the static upper die 3. Due to friction between the mould shell 5 and the ceramic powder 9 and/or the graphite layer 7 the mould shell 5 moves lightly upwards (FIG. 2). Due to the movement of the mould shell 5 the mould shell 5 becomes unconnected to the support 13. In this disconnected state the mould shell 5 moves automatically in a position where the shearing stress of the circumferential face of the ceramic powder 9 and/or of the graphite layer 7 is at its minimum.

In the illustrated embodiment the support 13 may be tubular and thus serving as heat radiation protection. This kind of heat radiation protection prevents that heat radiation emitted from the piston 12, the lower die 11 or other parts from escaping. Thus the heat applied by the heating elements 4 remain inside the mould shell 5 for heating the ceramic powder 9. An unwanted cooling is avoided.

In a further embodiment more than one mould shell 5 is provided (FIG. 3). This enables providing every stack or every unit of stacks with its own mould shell 5. In order to encapsulate the stacks into the mould shells 5 a spacer element 15 is provided as kind of a "floating die" arranged between the upper and lower community of stacks. The spacer element 15 may comprise an especially dedicated fold away support for supporting the upper mould shell 5. In the illustrated embodiment a second support 14 is provided for supporting the upper mould shell 5. The second support 14 is preferably moveable, so that the second support 14 does not hamper the heating of the ceramic powder 9 by means of the heating elements 4. The second support 14 may move onto the support 13 after the upper mould shell 5 reaches its disconnected state.

By means of the illustrated apparatuses and the method according to the invention a GOS-ceramic material in the composition as defined in WO 2005/110943 hereby incorporated by reference is possible whereby the homogeneity of the GOS-ceramic material is increased.

The particular combinations of elements and features in the above detailed embodiments are exemplary only; the interchanging and substitution of these teachings with other teachings in this and the patents/applications incorporated by reference are also expressly contemplated. As those skilled in the art will recognize variations, modifications and other implementations of what is described herein can occur to those of ordinary skill in the art without departing from the spirit and the scope of the invention as claimed. Accordingly, the forgoing description is by way of example only and is not intended as limiting. The invention's scope is defined in the following claims and the equivalents thereto. Furthermore, reference signs used in the description and claims do not limit the scope of the invention as claimed.

The invention claimed is:

1. A hot axial pressing method for sintering a ceramic powder comprising:
    placing a first porous body, the ceramic powder and a second porous body into a mold shell supported by a support, wherein the ceramic powder is located between the first porous body and the second porous body,
    evacuating gaseous components from the ceramic powder up to an ambient pressure of less than 0.8 bar,
    heating the porous bodies and the ceramic powder up to a temperature of about 900.degree. C.;
    applying a pressure to the porous bodies and the ceramic powder to about 75 MPa; and
    disconnecting the mold shell and the support in the heating and applying pressure step,
    wherein a variation in time of the heating step and a variation in time of the pressure applying step are adjusted to each other such that the mold shell is held by the porous bodies and/or the ceramic powder in a disconnected state with respect to the support.

2. The method according to claim 1, wherein a lubricant, is provided on the mold shell such that the friction between the mold shell and the ceramic powder and between the mold shell and the porous bodies is reduced.

3. The method according to claim 1, wherein at least a first stack and a second stack are provided, wherein each stack comprises the ceramic powder provided between the porous bodies, the first stack and the second stack are placed into two different mold shells and each mold shell is held in the disconnected state.

4. The method according to claim 3, wherein a spacer element is provided between the first stack and second stack for encapsulating a stack in its mold shell, wherein the spacer element comprises a stopper element for limiting the relative movement of the mold shell with respect to the spacer element.

5. The method according to claim 4, wherein the geometry of the spacer element and the thermal expansion coefficient of the material used for the spacer element is chosen such that in the disconnected state of the mold shell a friction force for holding the mold shell by the ceramic powder and/or the porous bodies is lower than without the spacer element but higher than in the state before applying pressure.

6. The method according to claim 4, wherein the spacer element is connected to a temperature control means for adjusting the temperature of the spacer element and/or to a clamping means for clamping the mold shell to the spacer element.

7. The method according to claim 1, wherein the support is used as heat radiation protection.

8. The method according to claim 1, wherein the ceramic powder is doped with $Gd_2O_2s$.

9. The method according to claim 1, wherein the mold is moveable with respect to the ceramic powder and moves to a position where a shearing stress is reduced in response to a high shearing stress occurring between the mold shell and the ceramic powder and/or the porous bodies.

10. The method according to claim 1, further comprising: holding the mold shell by the porous bodies and/or the ceramic powder.

11. The method according to claim 10, wherein the porous bodies move inside the mold shell.

12. The method according to claim 1, further comprising: press fitting the porous bodies in the mold shell such that the porous bodies move by the dies inside the mold shell.

13. The method according to claim 1, further comprising: holding the mold shell at the beginning of the applying a pressure step only by the porous bodies only.

14. The method according to claim 13, further comprising: holding the mold shell at a later state of the applying a pressure step by both the porous bodies only and the ceramic powder.

15. The method according to claim 13, further comprising: holding the mold shell at a later state of the applying a pressure step only by the ceramic powder.

16. The method according to claim 1, wherein the applying a pressure step includes moving one of the porous bodies with respect to another one of the porous bodies.

17. The method according to claim 1, wherein moving the mold shell disconnects the mold shell from the support.

* * * * *